(12) United States Patent
Weinblatt

(10) Patent No.: US 8,250,595 B2
(45) Date of Patent: Aug. 21, 2012

(54) UTILIZING AN AUDIO SIGNAL TO MONITOR A PROGRAM WITH A TECHNIQUE THAT IS OPERABLE EVEN DURING A MUTE MODE

(76) Inventor: Lee S. Weinblatt, Teaneck, NJ (US)

( * ) Notice: Subject to any disclaimer, the term of this patent is extended or adjusted under 35 U.S.C. 154(b) by 310 days.

(21) Appl. No.: 12/490,291

(22) Filed: Jun. 23, 2009

(65) Prior Publication Data

US 2009/0316000 A1   Dec. 24, 2009

Related U.S. Application Data

(60) Provisional application No. 61/132,952, filed on Jun. 23, 2008.

(51) Int. Cl.
*H04H 60/32* (2008.01)
(52) U.S. Cl. .................... 725/18; 725/9; 725/12; 725/14
(58) Field of Classification Search .................. 725/9–16
See application file for complete search history.

(56) References Cited

U.S. PATENT DOCUMENTS 5,574,963 A * 11/1996 Weinblatt et al. ............ 455/2.01
2005/0216509 A1* 9/2005 Kolessar et al. ........... 707/104.1

* cited by examiner

*Primary Examiner* — Nicholas Corbo
(74) *Attorney, Agent, or Firm* — Cozen O'Connor

(57) ABSTRACT

An apparatus for monitoring a program signal received from a broadcast source that is to be performed by reproduction equipment, wherein an audio portion of the program signal is broadcast in combination with a monitoring code to provide a combined audio signal, comprising a switch, a code detector, and a component configured to receive the combined signal from the broadcast source and to provide to each of the reproduction equipment and the switch a respective output signal related to the combined signal. The code detector is adapted to receive an audio output from the reproduction equipment which has a mute mode, the reproduction equipment transmitting at least the monitoring code from the combined audio signal to the code detector if not in the mute mode and not transmitting the monitoring code to the code detector if in the mute mode. The switch is configured to transmit at least the monitoring code from the combined audio signal to the code detector if the reproduction equipment is in the mute mode and not transmit the monitoring code to the code detector if the reproduction equipment is not in the mute mode.

10 Claims, 2 Drawing Sheets

UTILIZING AN AUDIO SIGNAL TO MONITOR A PROGRAM WITH A TECHNIQUE THAT IS OPERABLE EVEN DURING A MUTE MODE

This application claims priority from U.S. Provisional Patent Application Ser. No. 61/132,952 which was filed on Jun. 23, 2008, the entire content of which is hereby incorporated by reference.

FIELD OF THE INVENTION

This invention is directed to a code-based monitoring technique for monitoring a program signal reproduced on a television or radio set and, in particular, for enabling detection of a code combined with an audio portion of the signal even when the audio of the set is in a mute mode.

BACKGROUND OF THE INVENTION

Various techniques are known for monitoring transmissions from signal sources such as a television station, a radio station, satellite and cable television providers (referred to collectively hereinafter as "broadcast source"). The signal of interest might be a program being transmitted by cable or satellite, or it might be a recorded program being played back on a DVD or VCR. The program may be a "show" providing musical or dramatic entertainment, or it might be a commercial. The monitoring is carried out to provide information that, for example, reveals the size of the audience tuned to a given broadcast source at a given time of day, determines the total number of people who have seen a program, provides independent validation that a commercial has been broadcast, and so on. Such information is useful for broadcasters, advertisers, etc. As used hereinafter, the term "program signal" is intended to include all such signals, be they, for example, a real time broadcast or one that has been recorded, to be suitably reproduced to be electronically performed for viewing by an audience of a show or a commercial about which such information is being collected.

One approach that has been adopted to perform such monitoring is to combine the audio portion of a program signal with a code signal. This is disclosed in U.S. Pat. No. 4,718,106. Other approaches utilizing such a combined signal are disclosed in U.S. Pat. Nos. 5,457,807 and 5,630,203. The combined signal is made available, such as by on-air broadcast, to an intended audience. The audio signal, including the code portion, is reproduced by the speaker. Certain members of the intended audience who agree to participate in such monitoring are provided with a portable monitoring apparatus that is to be worn by these members and which can detect the code portion of the combined signal as reproduced by the speaker.

When a television set, for example, is placed in what is conventionally known as a mute mode, the audio portion of the program signal is inhibited from producing sound by blocking it from reaching the speaker. Of course, since the code portion is part of the audio signal, muting also results in suppressing the code signal from being reproduced by the speaker. In the absence of such a reproduced code signal, it is not possible to continue monitoring the program signal by relying on the code portion of the combined signal. Consequently, a mute mode creates a gap in the capability of the monitoring apparatus to perform the desired monitoring tasks.

Continuing to perform monitoring tasks even during muting is useful because the viewer can still be watching the program and/or the commercials even though the audio is muted. In fact, for some situations the sound can be inaudible in the normal mode of viewing the program, such as for deaf persons, or in a very noisy environment such as a bar. For such instances, there may be closed captioned text displayed on the TV screen corresponding to the audio portion of the program. Also, when commercial validation is being performed (i.e., to check whether a commercial that has been paid for is actually transmitted by the broadcast source), the commercial might coincidentally be shown during muting. In such a case, the monitoring results would be incorrect because they would indicate that the commercial was not broadcast when, it fact, it was. In such a situation, obtaining monitoring information during muting would be of critical importance to determine whether or not a commercial which has been paid for has actually been broadcast. Thus, it is highly desirable to maintain the monitoring capability even though a mute mode has been actuated.

U.S. Pat. No. 5,574,963 provides a solution which involves a switch that feeds only the code portion of the audio signal to the speaker even while the rest of the audio signal is blocked from reaching the speaker. Although this approach is effective to enable monitoring to continue even during a mute mode, it has the shortcoming of requiring a retrofit of the TV set by wiring a special switch into its circuitry. It is preferable to avoid such a task in order to eliminate an inconvenience to the household where the monitoring is to take place, and also the attendant costs to the monitoring service provider.

SUMMARY OF THE INVENTION

An object of the invention is to provide an improved apparatus for monitoring a program signal transmitted by a broadcast source.

A further object of the invention is to enable a monitoring apparatus, which utilizes an audio code for its monitoring operation, to continue such monitoring operation even during a mute mode.

These and other objects are attained in accordance with one aspect of the invention directed to an apparatus for monitoring a program signal received from a broadcast source that is to be performed by reproduction equipment, wherein an audio portion of the program signal is broadcast in combination with a monitoring code to provide a combined audio signal, comprising a switch, a code detector, and a component configured to receive the combined signal from the broadcast source and to provide to each of the reproduction equipment and the switch a respective output signal related to the combined signal. The code detector is adapted to receive an audio output from the reproduction equipment which has a mute mode, the reproduction equipment transmitting at least the monitoring code from the combined audio signal to the code detector if not in the mute mode and not transmitting the monitoring code to the code detector if in the mute mode. The switch is configured to transmit at least the monitoring code from the combined audio signal to the code detector if the reproduction equipment is in the mute mode and not transmit the monitoring code to the code detector if the reproduction equipment is not in the mute mode.

Another aspect of the invention directed to a method for monitoring a program signal received from a broadcast source that is to be performed by reproduction equipment, wherein an audio portion of the program signal is broadcast in combination with a monitoring code to provide a combined audio signal, comprising the steps of providing a switch, providing a code detector, providing a component configured to receive the combined signal from the broadcast source and to provide to each of the reproduction equipment and the switch a respective output signal related to the combined signal, providing to the code detector an audio output from the reproduction equipment, which has a mute mode, so that the reproduction equipment transmits at least the monitoring code from the combined audio signal to the code detector if not in the mute mode and does not transmit the monitoring code to the code detector if in the mute mode, and transmitting from the switch to the code detector at least the monitoring code from the combined audio signal if the reproduction equipment is in the mute mode and not transmitting the monitoring code from the switch to the code detector if the reproduction equipment is not in the mute mode.

DETAILED DESCRIPTION OF THE DRAWINGS

U.S. Pat. No. 7,155,159 discloses an audience detection technique shown in the schematic block diagram depicted in FIG. 1, which is a copy of FIG. 1 from such patent. The content of U.S. Pat. No. 7,155,159 is hereby incorporated herein by reference. Components from such patent that are referred to herein and shown in FIG. 2 use the same reference numbers as those that appear in such patent.

Figure 1:
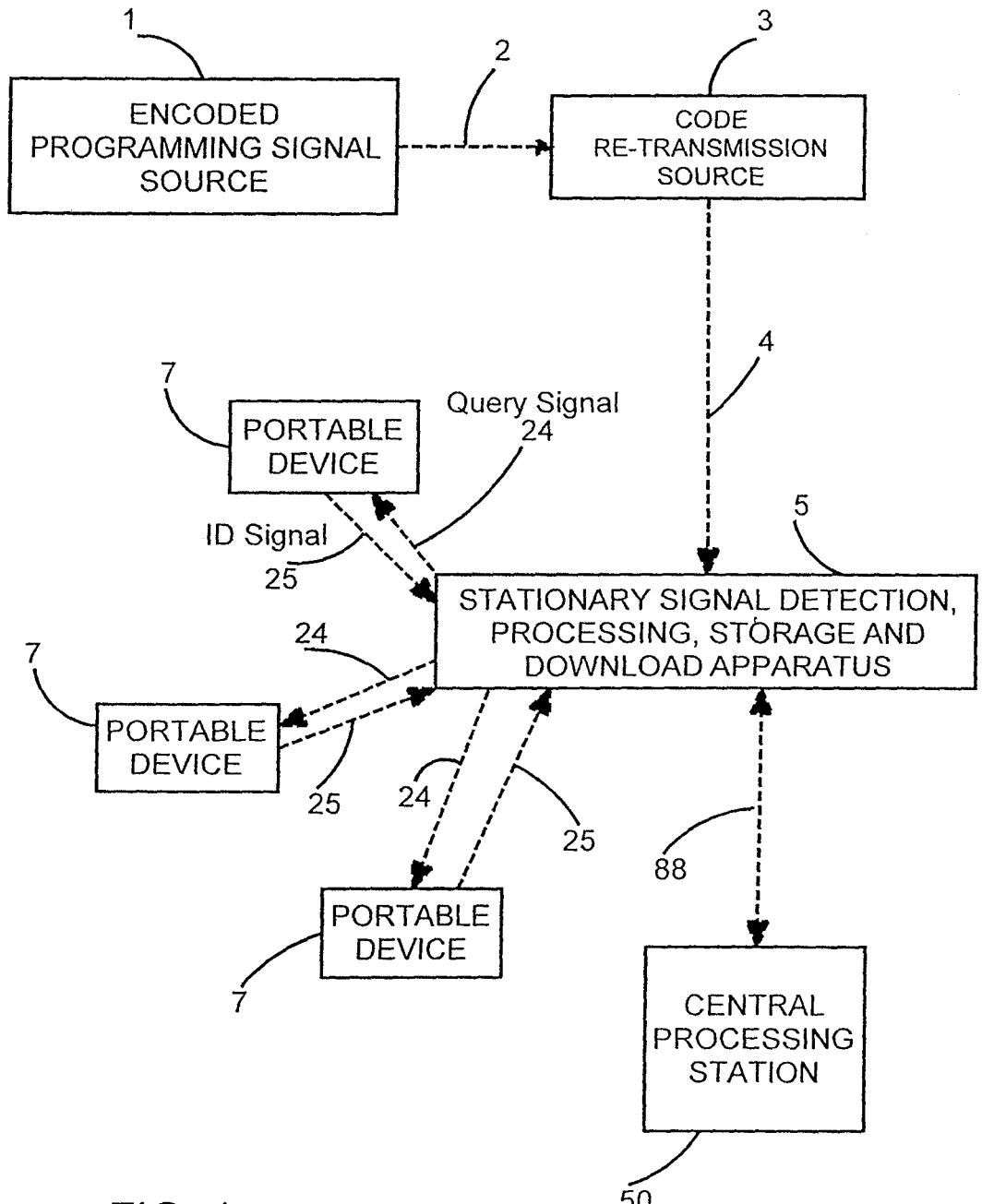
FIG. 1 shows a schematic block diagram of a prior art approach to monitor a program signal and its audience.

As shown in FIG. 1, an encoded signal is generated by a program signal source 1, such as a TV broadcast station. Its output signal 2, which is a combination of a programming signal and a surveying code, is received by code retransmission source 3. Code retransmission source 3 is located typically in a household having members participating in the monitoring effort, and it can be capable of suitably reproducing the programming signal for video and/or audio performance. However, for audience surveying purposes, its key function is to detect the surveying code in the signal 2 received from programming signal source 1, and then to retransmit it in suitable fashion as acoustic output signal 4. More specifically, the surveying code is an audio signal that is reproduced by speakers as acoustic output signal 4. The code re-transmitted by code retransmission source 3 as acoustic output signal 4 is detected and processed by stationary apparatus 5. A plurality of portable devices 7 operate cooperatively with stationary apparatus 5 to identify audience members, e.g. those persons in the household who are watching the TV program identified by the surveying code.

Figure 2:
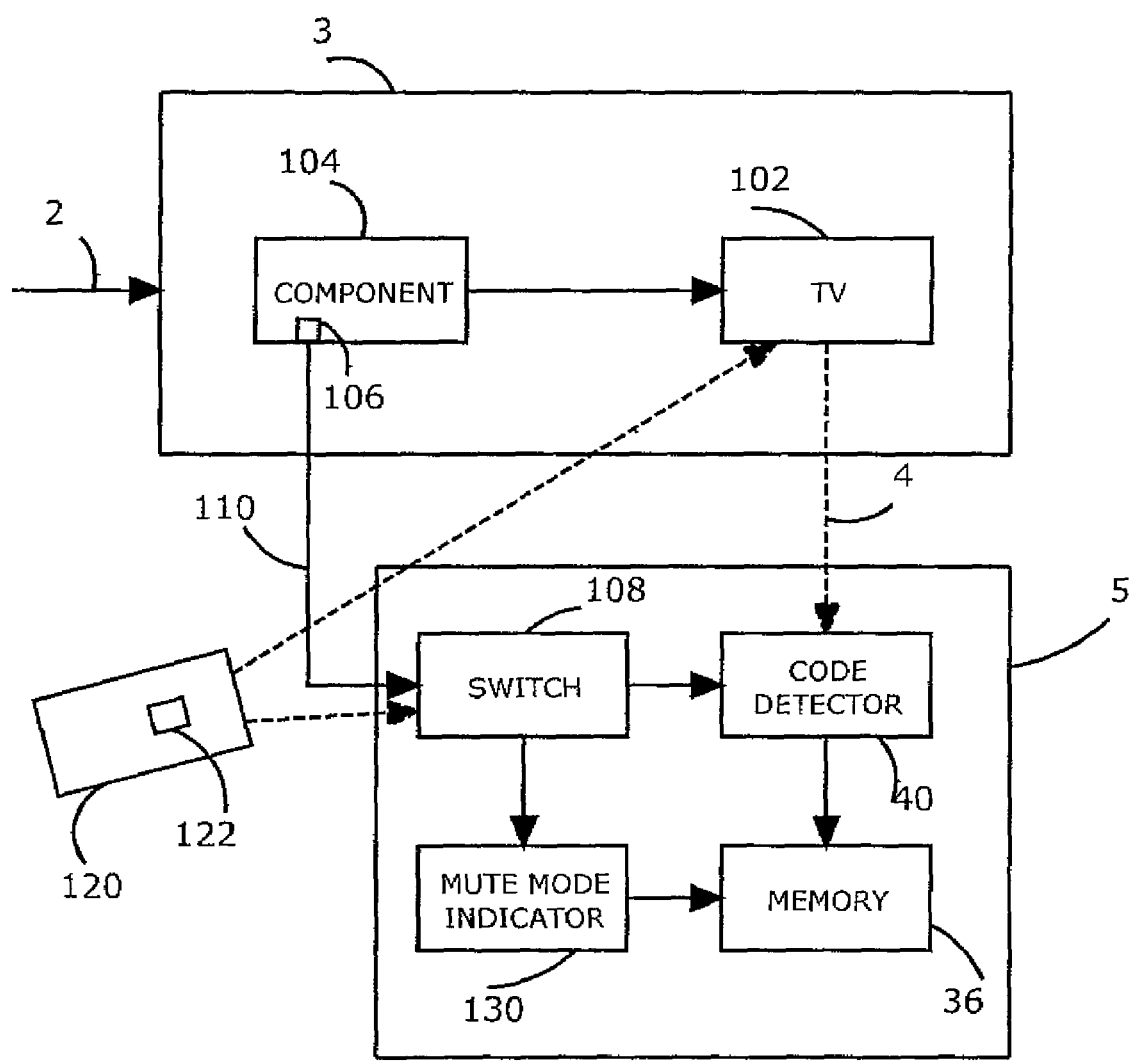
FIG. 2 shows a schematic block diagram of an embodiment of the invention.

In accordance with an embodiment of the present invention as shown in FIG. 2, code retransmission source 3 includes a television set (TV) 102 that receives an input signal from an electronic signal reception and/or recording component 104. Component 104 can be a set top cable box or satellite box that receives signal 2 from the programming signal source 1, performs any necessary processing, such as decrypting an encrypted satellite signal, for example, and provides such signal (via a wire or wirelessly) to TV 102. The component 104 can likewise be a VCR or a DVD. Such components typically have an AUDIO OUT jack 106.

Stationary apparatus 5 shown in FIG. 2 can include the circuits shown in FIG. 2 of U.S. Pat. No. 7,155,159. Among those circuits is code detector 40. For the sake of convenience and simplicity, only code detector 40 is shown from among the circuits of stationary apparatus 5 disclosed in U.S. Pat. No. 7,155,159. Code detector 40 identifies the code in acoustic signal 4 reproduced by the speaker of TV 102. For example, a microphone in code detector 40 detects acoustic output signal 4 and generates a corresponding electrical signal that is processed by the code detection circuitry of code detector 40. Stationary apparatus 5 also includes a switch 108 which is connected by a wire 110 to the AUDIO OUT jack 106 of component 104. Wire 110 can alternatively be replaced by a wireless arrangement. Switch 108 is an ON/OFF switch that either permits the audio signal from AUDIO OUT jack 106 to reach the code detection circuitry of code detector 40, or which blocks such signal. Thus, when switch 108 is closed, the audio signal from component 104 reaches code detector 40. However, when switch 108 is open, it blocks the audio signal.

A typical remote control 120 is also shown in FIG. 2. It includes a key pad (not shown) and a mute button 122. Switch 108 is responsive to the operation of mute button 122 so that when the mute mode is actuated, the normally open switch 108 is closed. Thus, when TV 102 enters its mute mode, simultaneously switch 108 is closed so that the audio signal from component 104 is inputted to code detector 40. Alternatively, switch 108 could respond to mute circuitry in TV 102 when the TV senses actuation of a mute mode.

In operation, component 104 feeds the combined signal 2 to TV 102 which performs the function of displaying the video and reproducing the audio. Audio signal 4 which includes the coded portion, reaches code detector 40 which identifies any monitoring codes contained therein and stores them in memory 36. However, when remote control 120 actuates a mute mode, the speaker of TV 102 is prevented from producing acoustic signal 4. Thus, no acoustic signal from TV 102 reaches code detector 40. Simultaneously with the deactivation of the speaker in TV 102, switch 108 is closed to thereby input the audio from combined signal 2 to code detector 40. Thus, code detector 40 continues to receive the combined audio signal without any interruption despite the TV being in the mute mode.

As an additional feature included in a variation of this embodiment, mute mode indicator 130 is provided. It generates an indicator signal whenever switch 108 is closed, and indicates that TV 102 is in the mute mode. The indicator signal is inputted to memory 36 in association with monitoring codes from code detector 40 that occur during the mute mode. Operation of mute mode indicator 130 is triggered by switch 108 when it is closed in response to a mute signal detected from remote control 120. Thus, memory 36 stores information capable of identifying the detected codes that occurred during a mute mode so that such information is available should it be found valuable for a particular purpose when processing the audience detector data.

The disclosed embodiment requires no retrofitting of any components owned by the participating household, i.e. TV 102 and component 104. These remain completely unchanged and perform their normal functions. The only modified component is stationary apparatus 5 which is provided to the household by the monitoring service provider. Such apparatus is self-contained and relatively small. It simply needs to be placed near the TV, plugged into a wall outlet, telephone line and the AUDIO OUT jack, and the installation is complete.

It should be apparent that various modifications to the specific embodiments described in detail hereinabove will readily occur to any person with ordinary skill in the art. These are all intended to fall within the scope of the present invention as defined by the following claims.

The invention claimed is:

1. An apparatus for monitoring a program signal received from a broadcast source that is to be performed by reproduction equipment, wherein an audio portion of the program signal is broadcast in combination with a monitoring code to provide a combined audio signal, comprising:
   a switch;
   a code detector configured to detect the monitoring code in the combined audio signal; and
   a component configured to receive the combined signal from the broadcast source and to provide, to each of the reproduction equipment and the switch, a respective output signal related to the combined signal;
   wherein the code detector is adapted to receive an audio output from the reproduction equipment which has a mute mode, the reproduction equipment transmitting at least the monitoring code from the combined audio signal to the code detector if not in the mute mode and not transmitting the monitoring code to the code detector if in the mute mode; and
   wherein the switch is configured to transmit the combined audio signal to the code detector if the reproduction equipment is in the mute mode and not transmit the combined audio signal to the code detector if the reproduction equipment is not in the mute mode.

2. The apparatus of claim 1, further comprising a memory coupled to an output of the code detector and configured to store the detected monitoring codes.

3. The apparatus of claim 2, further comprising a mute mode indicator configured to output an indicator signal when said reproduction equipment is in the mute mode, said indicator signal being inputted to said memory which is configured to store said indicator signal in association with the stored monitoring codes occurring during the mute mode.

4. The apparatus of claim 1, wherein said switch is configured to respond to a mute mode actuation signal.

5. A method for monitoring a program signal received from a broadcast source that is to be performed by reproduction equipment, wherein an audio portion of the program signal is broadcast in combination with a monitoring code to provide a combined audio signal, comprising the steps of:
   providing a switch;
   providing a code detector configured to detect the monitoring code in the combined audio signal;
   providing a component configured to receive the combined signal from the broadcast source and to provide, to each of the reproduction equipment and the switch, a respective output signal related to the combined signal;
   providing to the code detector an audio output from the reproduction equipment, which has a mute mode, so that the reproduction equipment transmits at least the monitoring code from the combined audio signal to the code detector if not in the mute mode and does not transmit the monitoring code to the code detector if in the mute mode; and
   transmitting from the switch to the code detector the combined audio signal if the reproduction equipment is in the mute mode and not transmitting the combined audio signal from the switch to the code detector if the reproduction equipment is not in the mute mode.

6. The method of claim 5, further comprising storing the detected monitoring codes.

7. The method of claim 6, further comprising generating an indicator signal when said reproduction equipment is in the mute mode, and storing said indicator signal in association with the stored monitoring codes occurring during the mute mode.

8. The method of claim 5, further comprising configuring said switch to respond to a mute mode actuation signal.

9. The apparatus of claim 1, wherein the component is configured to directly provide, to each of the reproduction equipment and the switch, a respective output signal related to the combined signal.

10. The method of claim 5, wherein the component is configured to directly provide, to each of the reproduction equipment and the switch, a respective output signal related to the combined signal.

* * * * *